United States Patent [19]

Hartmann

[11] Patent Number: 4,842,291
[45] Date of Patent: Jun. 27, 1989

[54] ENCLOSED MULTIPLE SPEED DRIVE FOR LOW MAINTENANCE CHAIN DRIVEN BICYCLES

[76] Inventor: Dirck T. Hartmann, 4121 Morning Star Dr., Huntington Beach, Calif. 92649

[21] Appl. No.: 77,282
[22] Filed: Jul. 22, 1987
[51] Int. Cl.$^4$ .............................................. B62M 9/06
[52] U.S. Cl. ................................ 280/238; 280/261; 74/750 B; 74/781 B
[58] Field of Search .............. 280/236, 238, 259, 260, 280/261; 474/144, 146, 147; 74/594.1, 594.2, 594.4, 750 B, 781 B, 660, 674, 394, 760

[56] References Cited

U.S. PATENT DOCUMENTS

| | | | |
|---|---|---|---|
| 626,875 | 6/1899 | Smith | 280/259 |
| 2,169,171 | 8/1939 | Torres | 74/750 B |
| 3,433,097 | 3/1969 | Fox | 74/750 B |
| 3,908,807 | 9/1975 | Ozaki | 74/750 B X |
| 3,934,493 | 1/1976 | Hillyer | 74/750 B |
| 3,955,444 | 5/1976 | Munn | 74/750 B |
| 4,651,590 | 3/1987 | Thun | 74/594.4 X |
| 4,706,982 | 11/1987 | Hartmann | 74/750 B X |
| 4,721,015 | 1/1988 | Hartmann | 74/750 B |

FOREIGN PATENT DOCUMENTS

| | | | |
|---|---|---|---|
| 69533 | 7/1892 | Fed. Rep. of Germany | 474/146 |
| 213440 | 9/1908 | Fed. Rep. of Germany | 280/261 |
| 319987 | 4/1920 | Fed. Rep. of Germany | 280/261 |
| 29101 | 12/1914 | United Kingdom | 74/750 B |
| 738338 | 10/1955 | United Kingdom | 74/750 B |

Primary Examiner—Charles A. Marmor

[57] ABSTRACT

An enclosed drive for a low maintenance bicycle features a chain case which replaces the conventional chain stay on the right side of the bicycle, and an improved nine speed planetary transmission housed within a gear case inside the rear wheel hub. The chain case is press fit on a steel tube rotatably mounted in the bottom bracket, and the rear spindle is clamped in the rear dropouts with over center quick disconnects. To change the rear tire, the rear spindle is released and the chain case is rotated about the axis of the bottom bracket to swing the rear wheel clear of the frame. The wheel, which is attached to the gear case with four bolts, can then be removed from the left side without disturbing or exposing any of the drive train components.

4 Claims, 4 Drawing Sheets

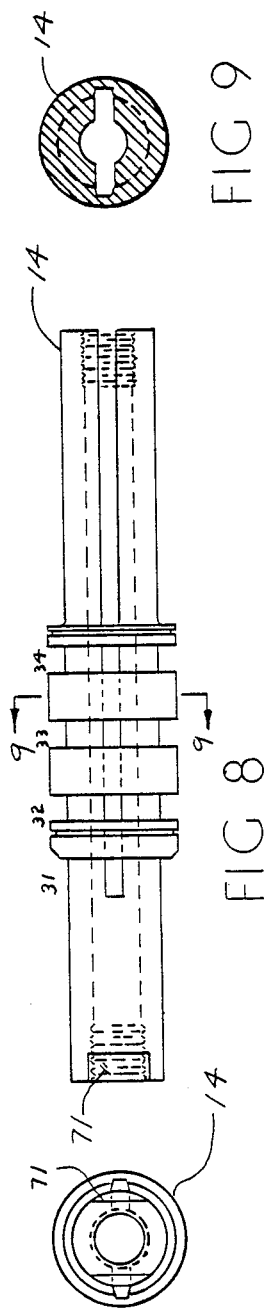
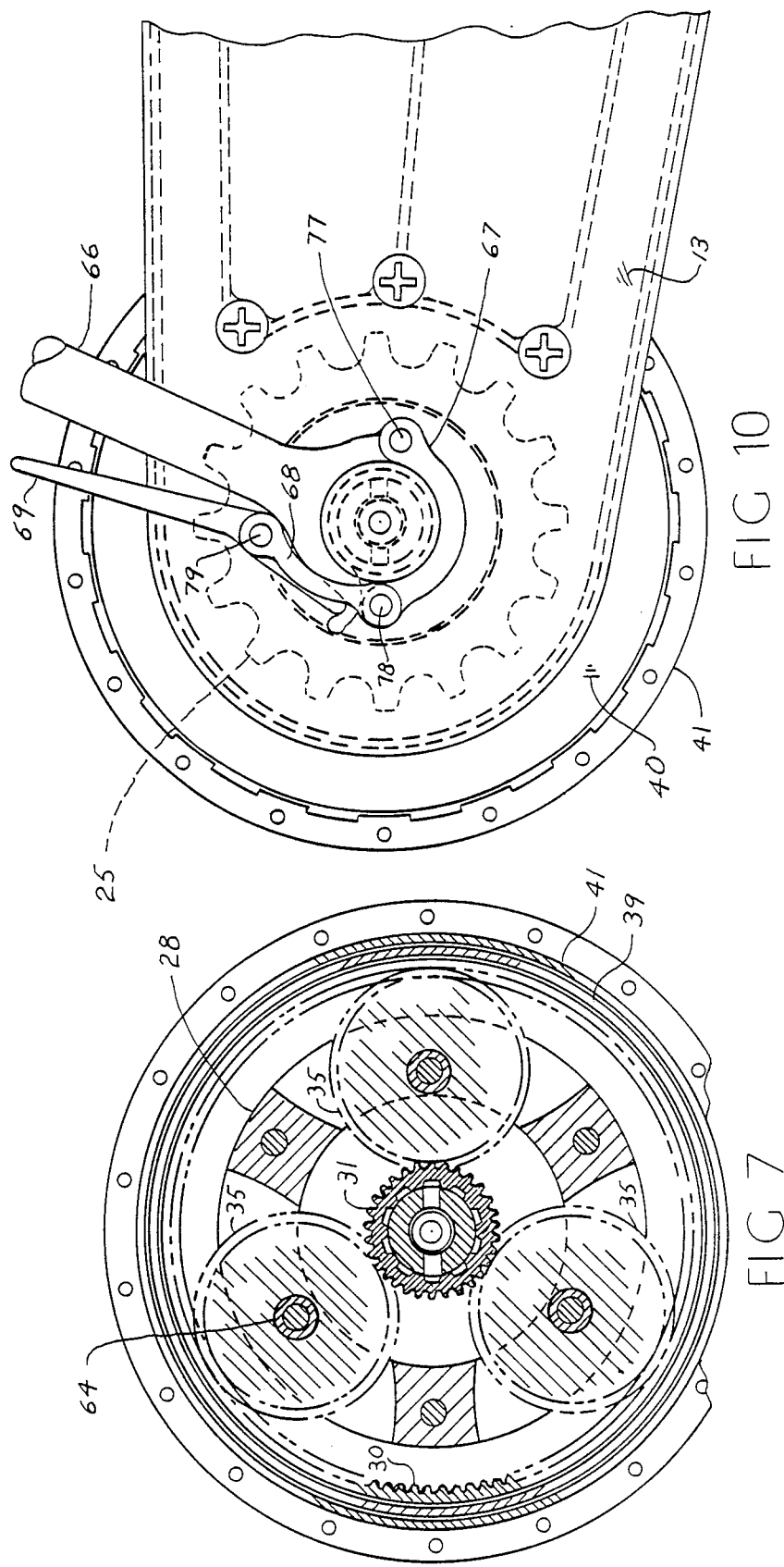

ENCLOSED MULTIPLE SPEED DRIVE FOR LOW MAINTENANCE CHAIN DRIVEN BICYCLES

BACKGROUND OF THE INVENTION

1. Field of the Invention:

This invention relates generally to multiple speed epicyclic or planetary transmissions housed within the rear hub of chain driven bicycles in addition to a modification of a conventional bicycle frame which permits the chain to be fully enclosed.

2. Description of the Prior Art:

Multiple speed bicycles commonly use either a chain and derailleur system with ten to fifteen speeds, or a chain driven rear hub providing three speeds with a single epicyclic gear train, and four to seven speeds with a pair of co-operating epicyclic gear trains. The U.S. patent to Hillyer, No. 3,934,493, provides seven speeds with two co-operating epicyclic gear trains but requires six one way clutches and a complicated shift mechanism which makes it too costly to compete with bicycles using the chain and deraileur system. On all chain driven bicycles the chain must be kept reasonably clean and well oiled for efficient operation and to prevent premature chain failure and chain maintenance becomes particularly troublesome if the bicycle is ridden extensively on dirt roads and trails. With the current popularity of off-road and mountain bicycles, a sealed chain drive is needed to mininmize the maintenance problem with a bicycle which can serve for commuting as well as off-road recreation riding. An object of the present invention is to provide an enclosed chain drive which essentially eliminates chain maintenance coupled with an improved multiple speed planetary transmission sealed in a gear case within the rear hub, with a range of speeds comparable to ten speed chain and derailleur touring bicycles.

SUMMARY OF THE INVENTION

The enclosed multiple speed drive in accordance with this invention includes a chain case, preferably of die cast aluminum, which is press fit on a steel tube rotatably mounted in an otherwise conventional bottom bracket. This chain case replaces the conventional chain stay on the right side of the bicycle. The chain case with the case cover which is attached to it with flush head screws, encloses the sprockets and the drive chain and reacts the load from drive chain tension.

The nine speed epicyclic transmission in accordance with this invention is housed in a gear case inside the rear wheel hub and includes a single ring gear; a single planet gear carrier; four different size sun gears rotatably mounted on a fixed rear spindle with a sun gear selector whose axial position is adjustable for locking any selected one of the sun gears to the spindle; four sets of planet gears rotatably mounted on the planet gear carrier with each set in constant mesh with one of the sun gears and the ring gear; a drive fitting driven by the rear sprocket with a drive ring slidably mounted on it for engaging and driving either the ring gear or the planet gear carrier; two conventional one way clutches coupling respectively the ring gear and the planet gear carrier with the gear case, with the pawls of the clutch driving the gear case from the ring gear arranged to be disengaged from the gear case through engagement of the drive ring with the ring gear; and two conventional pin/chain assemblies installed on the centerline of the spindle and connected through conventional cable assemblies with shift levers on the bicycle frame for adjusting the axial positions of the drive ring and the sun gear selector.

An over center quick release comprising a cap link pinned to the bicycle frame, a pair of spring links pinned to the cap link, and a handle pinned to the spring links, is used to clamp each end of the hub spindle in its frame dropout by placing the nose of the handle in a notch in the frame and rotating the handle up and forward forcing the spring links overcenter. An inward facing flange on the wheel hub is joined to the gear case on the left side with four bolts and through a spline on the gear case on the right side. The wheel is separated from the gear case by removing the four bolts, releasing the over center quick disconnects, rotating the chain case about the axis of the bottom bracket to swing the wheel clear of the frame, and pulling the wheel off the gear case from the left side.

BRIEF DESCRIPTION OF THE DRAWINGS

FIG. 7 is a section taken along the line 7—7 of FIG. 2;

FIG. 8 is a side and an end elevation of the hub spindle;

FIG. 9 is a section taken along the line 9—9 of FIG. 8;

FIG. 10 is a right side elevation view of the rear hub; and

DESCRIPTION OF THE PREFERRED EMBODIMENT

Figure 3:
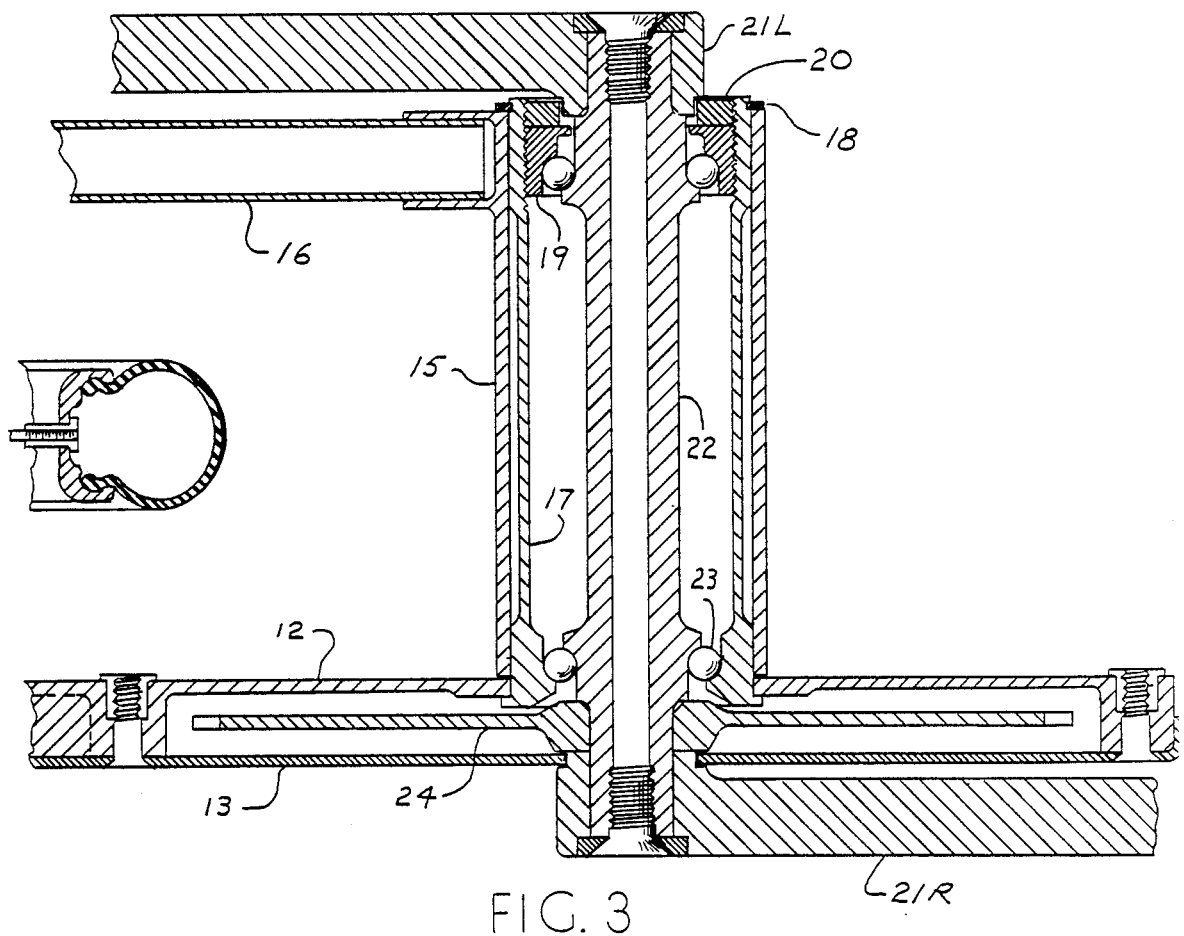
FIG. 3 is a section taken along the line 3—3 of FIG. 1.

Referring to FIG. 3, the enclosed chain drive in accordance with the present invention includes a chain case 12; a chain case cover 13; a bottom bracket 15 which is integral with the bicycle frame and conventional except that the chain case replaces the chain stay on the right side; the left side chain stay 16; and the bearing tube 17 which is press fit in the chain case 12. The bearing tube 17 is mounted with a running fit in the bottom bracket 15 with its axial position secured by the snap ring 18. One end of the bearing tube 17 forms the outer race for the ball bearings 23 which support one end of the pedal drive shaft 22. The other end of the bearing tube 17 is threaded to receive the bearing nut 19 which forms the outer race for the ball bearings which support the end of the pedal drive shaft 22 on the left side. The bearing preload is adjusted with the bearing nut 19 and secured with the locknut 20. The cross section of the pedal drive shaft 22 is square for the transfer of torque from the pedal crank arms 21L and 21R. The pedal crank arm 21R secures the axial position of the forward sprocket 24 against a shoulder on the drive shaft 22. A small running clearance between the chain case cover 13 and the crank arm 21R, and between the locknut 20 and the crank arm 21L, minimizes the intrusion of dirt.

Figure 2:
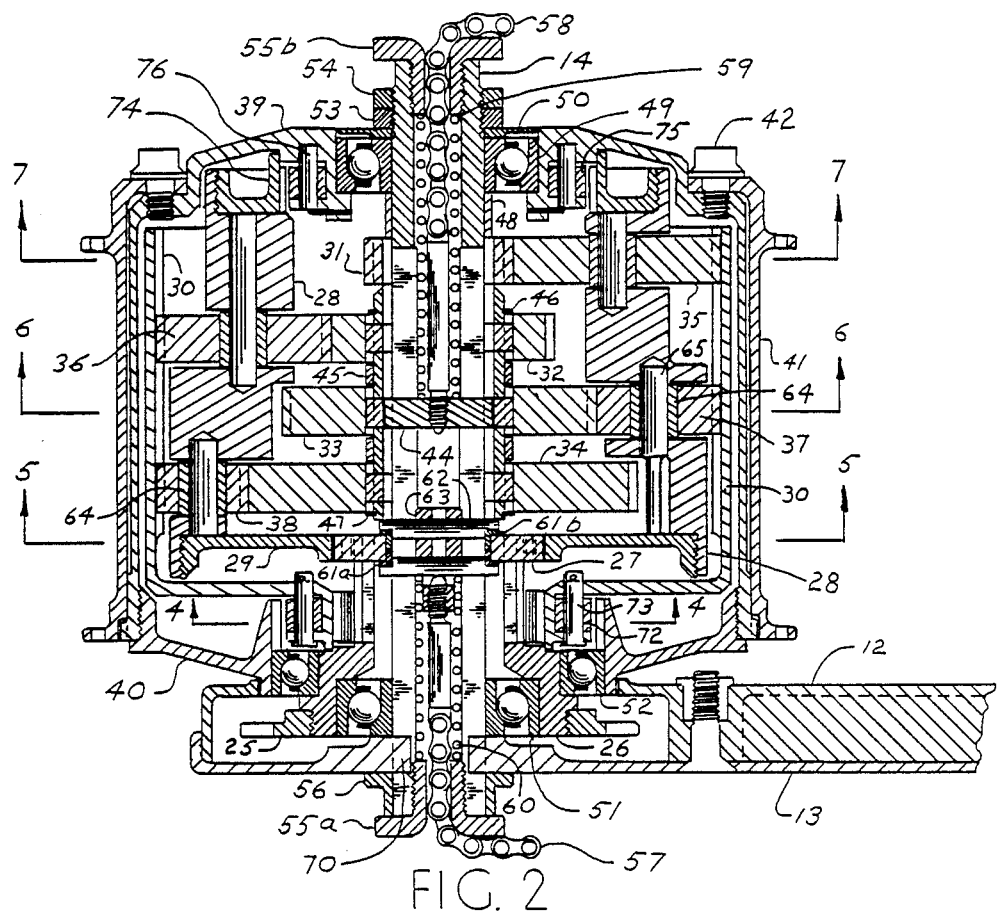
FIG. 2 is a section taken along the line 2—2 of FIG. 1.
Figure 1:
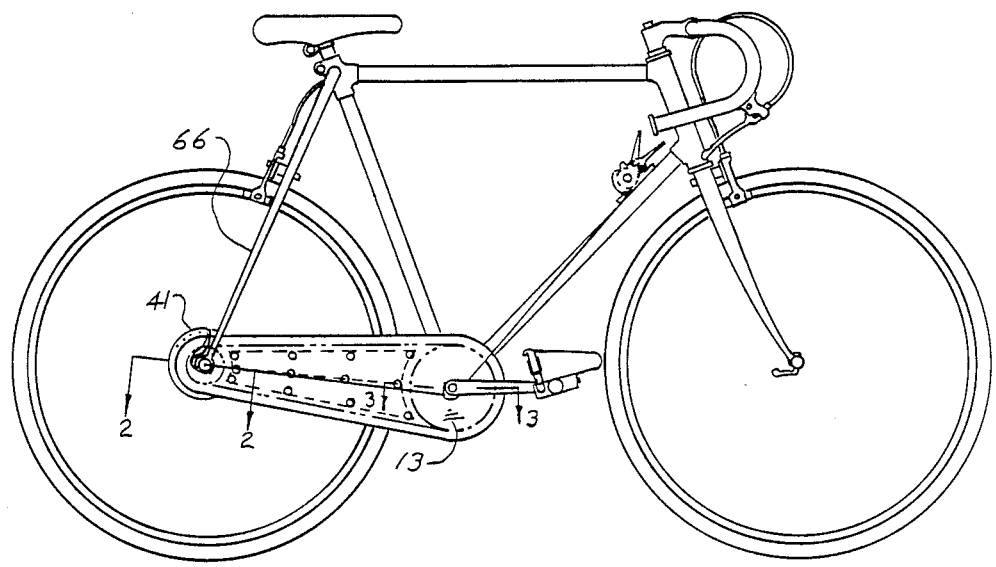
FIG. 1 is a side elevation view of a bicycle with a chain case and nine speed transmission located inside the hub of the rear wheel according to the present invention.

Referring to FIG. 2, the nine speed epicyclic transmission in accordance with the present invention includes a hub spindle 14 which is a close shear fit inside the chain case cover 13 with the tabs 70 on the cover 13 fitting down into a longitudinal slot in the spindle to keep the spindle indexed when the chain case is rotated to remove the rear wheel; a rear sprocket 25; a drive fitting 26 on which the sprocket 25 is threaded with right hand threads so that the drive torque is tightening; a drive ring 27 which is splined to and slidably mounted on the drive fitting 26; a planet gear carrier 28; a planet gear carrier drive plate 29, with internal teeth matching the external teeth on the drive ring 27, is threaded into the planet gear carrier 28 with right hand threads; a ring gear 30; four sun gears 31, 32, 33, and 34, each rotatably mounted on the spindle 14; four sets of planet gears 35, 36, 37, and 38, with three planet gears in each set located 120 degrees apart in constant mesh with one of the sun gears and with the ring gear 30; a gear case 39; a gear case closing plate 40 which is threaded into the gear case 39 with right hand threads; and a wheel hub 41 which is bolted to the gear case 39 with the bolts 42.

Figure 11:
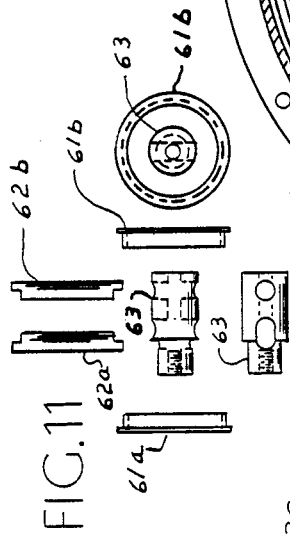
FIG. 11 is an exploded view of the components used to adjust the axial position of the drive ring.
Figure 5:
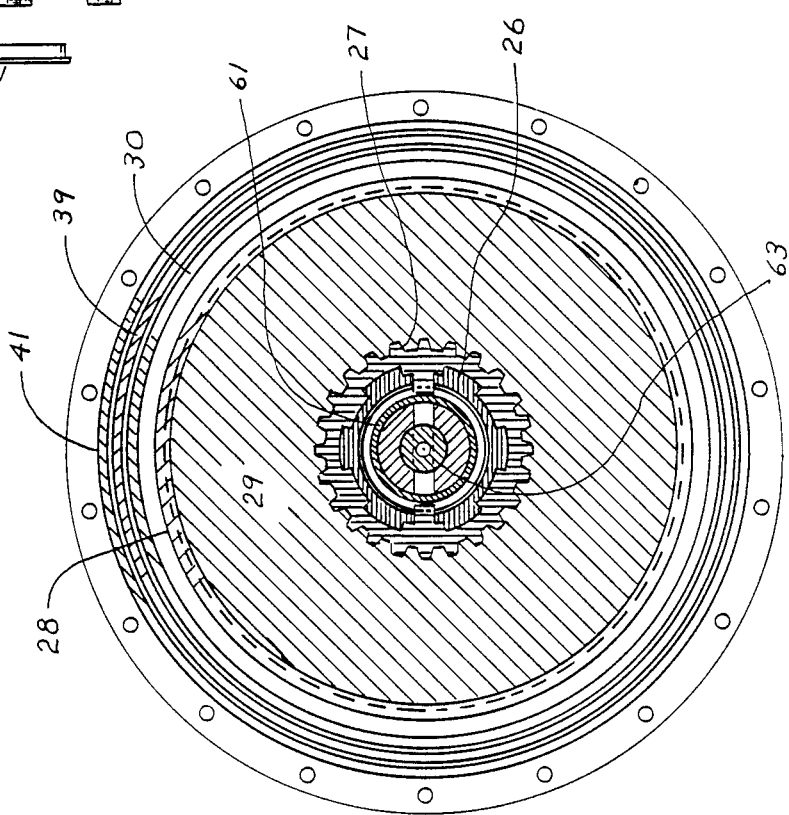
FIG. 5 is a section taken along the line 5—5 of FIG. 2.

As shown in FIG. 5, external teeth on the drive ring 27 mesh with internal teeth on the planet gear carrier drive plate 29 when the drive ring is located in the plane of the drive plate, and an internal spline on the drive ring 27 slidably engages an external spline on the drive fitting 26. As shown in FIGS. 2 and 5, tabs on the drive ring 27 extend radially inward through axial slots in the drive fitting 26 and fit between the flanges on the shoulder bushings 61a and 61b between which the drive ring 27 can rotate freely. An exploded view of the components used to adjust the axial positions of the shoulder bushings 61a and 61b is shown in FIG. 11. Notches in the ends of the pins 62a and 62b are located inside the ends of the shoulder bushings 61a and 61b. The pins 62a and 62b pass through holes in the sleeve 63 which is located on the centerline of the spindle 14 and are free to slide axially in the slot in the spindle. Referring again to FIG. 2, the hollow bolts 55a and 55b are threaded into opposite ends of the spindle 14. The return spring 60 is located between the bolt 55a and the sleeve 63 and forces the sleeve inward until the pin 62 reaches the end of the through slot in the spindle 14 in which position the drive ring 27 is in the plane of and keyed to the planet gear carrier drive plate 29 for driving the planet gear carrier. The pin/chain assembly 57 is threaded into the end of the sleeve 63 for moving the sleeve axially against the return spring 60.

Figure 4:
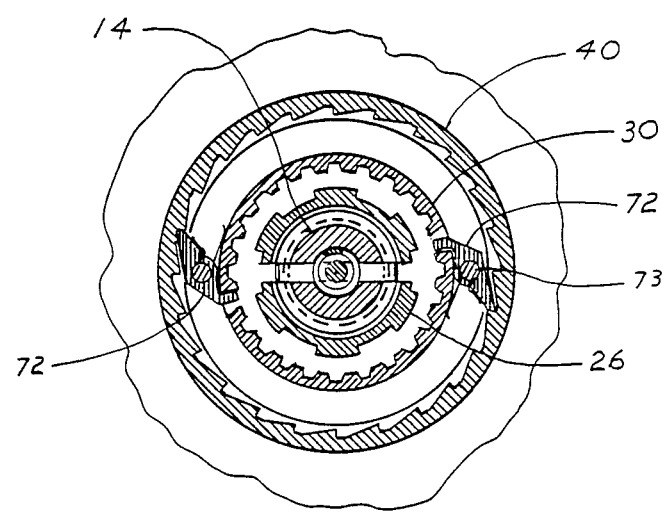
FIG. 4 is a section taken along the line 4—4 of FIG. 2.

Referring to FIG. 2 and particularly to FIG. 4, it can be seen that the internal teeth for driving the ring gear 30 match the external teeth on the drive ring 27 so that when the drive ring 27 is moved to the end of the axial slot in the drive fitting 26, the ring gear is driven at the speed of the rear sprocket 25. As the drive ring 27 is moved into this position, the teeth on the drive ring 27 engage the spring loaded pawls 72, which are mounted on the ring gear with the pins 73 and which couple the ring gear 30 with the gear case closing plate 40, and rotate the pawls 72 out of engagement with the ratchet teeth on the gear case closing plate 40, so that the gear case 39 can rotate at a rate slower than that of the ring gear. When the pin/chain assembly 57 allows the drive ring 27 to move inward from this end position about the width of the drive ring, the external teeth on the drive ring are disengaged from the pawls 72 which spring out and again engage the ratchet teeth on the gear case closing plate so the gear case 39 and wheel are driven at the speed of the sprocket 25.

Referring now to FIG. 8, it can be seen that the center portion of the spindle 14 has an increased diameter over that of the end portions. Three circumferential grooves are machined in this center portion of the spindle 14 with the spindle diameter at the bottom of each groove equal to that of the end portions of the spindle. Each of the grooves shown in FIG. 8 is labled with the number of the sun gear installed in its plane as shown in FIG. 2. The axial slot in the spindle terminates in the area in the plane of the sun gear 31. As shown in FIG. 9, the axial slot extends radially outward to about one half the depth of the circumferential grooves in the spindle 14. The left end of the spindle 14 has the flat areas 71 which fit snugly in the bicycle frame dropouts and prevent the spindle from rotating.

Figure 6:
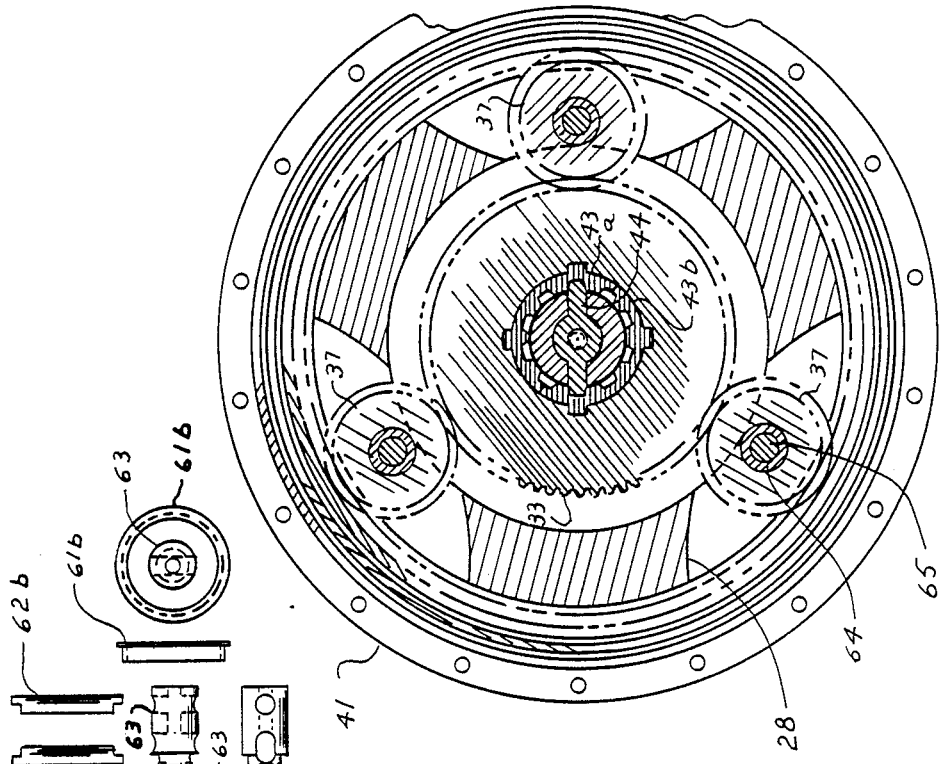
FIG. 6 is a section taken along the line 6—6 of FIG. 2.

Referring now to FIG. 2 and particularly to FIG. 6, it can be seen that a pair of ring halves 43a and 43b is installed in each of the three circumferential grooves in the spindle 14. Radial projections on the ring halves key them to the sun gear in the plane of which they are located. Each sun gear with its ring halves rotates freely on the spindle unless the sun gear selector 44 is located in its plane. As shown in FIG. 6, the ring halves 43a and 43b have an internal tooth form which matches the tooth form on the ends of the radial arms on the sun gear selector 44 so that the sun gear selector locks the sun gear in the plane of which it is located to the spindle 14. As shown in FIG. 2, the axial position of the sun gears is maintained by the snap ring 46 on the left side of sun gear 32, the sleeve spacers 46 between the gears, and the snap ring 47 on the ring side of sun gear 34.

Referring now to FIG. 7, it can be seen that the sun gear 31 has the same internal tooth form as the ring halves 43a and 43b so that, like the larger sun gears 32,33, and 34, it too can be locked to the spindle by locating the sun gear selector 44 in its plane. The axial position of the sun gear selector 44 is controlled with the return spring 59 and the pin/chain assembly 58 which is threaded into the selector 44 and which, like the pin/chain assembly 57, is connected to a shift lever on the bicycle frame.

As shown in FIGS. 6, a porous oil impregnated sintered bronze bushing 64 is press fitted into each planet gear and rotates freely on a polished steel pin 65. As shown in FIG. 2, the steel pins mounting the planet gears 37 and 38 are held captive in the planet gear carrier 28 by the drive plate 29 which is threaded into one end of the carrier, and the steel pins mounting the planet gears 35 and 36 are held captive in the planet gear carrier 28 by the ratchet ring 74 which is threaded into the opposite end of the carrier. The spring loaded pawls 75 coupling the gear case 39 with the planet gear carrier 28 are mounted on the gear case with the steel pins 76 and engage the teeth on the ratchet ring 74 so that the ratchet ring drives the gear case. When the drive ring 27 is positioned to drive the ring gear with the pawls 72 disengaged, the planet gears in the plane of the selected sun gear drive the planet gear carrier at a reduced rate of speed and the ratchet ring 74 drives the gear case 39. When the drive ring 27 is positioned to drive the planet gear carrier, the planet gears in the plane of the selected sun gear drive the ring gear at a multiplied rate of speed and the spring loaded pawls 72, which are mounted on the ring gear 30 with the steel pins 73, engage the ratchet teeth on the gear case closing plate 40 and drive the gear case at the speed of the ring gear, with the pawls 75 overrunning the teeth on the ratchet ring.

Referring once again to FIG. 2, the drive fitting 26 is seated on the angular contact ball bearing 51 which is captive between a shoulder on the drive fitting and the chain case cover 13 with axial load from the bearing carried through the shoulder bushing 56 to the hollow bolt 55a. The gear case closing plate 40 is seated on the angular contact ball bearing 52 which is captive between a shoulder on the drive fitting 26 and the ratchet teeth on the closing plate 40. The gear case 39 is seated on the angular contact ball bearing 49 which is captive between a shoulder on the gear case and the bearing shield 50. The proper axial preload of the bearings 49, 51, and 52 is achieved with the preload adjustment nut 53 and the preload is secured with the locknut 54.

The transmission provides four low range speeds with the ring gear 30 driving the planet gear carrier 28 at a reduced rate of speed and the planet gear carrier driving the gear case through the ratchet ring 74. The four gear ratios provided during this low range operation is given by the expression Ratio=$(N+2n)/2(N+n)$ where N is the number of teeth in the selected sun gear and n is the number of teeth in each of the three meshing planet gears. The transmission provides a mid range speed with the ring gear driving the gear case closing plate at the speed of the rear sprocket through the pawls 72. The transmission provides four high range speeds with the planet gear carrier driving the ring gear at a multiplied rate of speed and the ring gear again driving the gear case closing plate. The four gear ratios provided during this high range operation is given by the expression Ratio=$2(N+n)/(N+2n)$ where, as before, N is the number of teeth in the selected sun gear, and n is the number of teeth in each of the meshing planet gears.

In the example design developed to illustrate the present invention, 32 pitch gears are used with 120 teeth and a resulting pitch diameter of 3.75 inches for the ring gear 30. The number of teeth in each of the four selected sun gears and its mating planet gears is given in the accompanying table together with the resulting low and high range gear ratios for the epicyclic transmission of the present invention together with the bicycle ratio for a bicycle with a sprocket ratio of 2.25:1. The equivalent wheel diameter is also given for a standard 26 inch wheel for convenient comparison with conventional ten speed bicycles with chain/derailleur drives. All the speeds are not equally efficient with the chain/derailleur system because of the angle the chain makes with the sprockets for some speeds, and shifting is not done in a simple set sequence that is easily mastered. These drawbacks are eliminated with the present invention as is also the requirement for frequent maitenance in dusty areas with the chain/derailleur system.

| Speed | N | n | Transmission Ratio | Bicycle Ratio | Equivalent Wheel Diameter (inches) |
|---|---|---|---|---|---|
| one | 84 | 18 | .588 | 1.323 | 34.4 |
| two | 66 | 27 | .645 | 1.451 | 37.7 |
| three | 48 | 36 | .714 | 1.606 | 41.8 |
| four | 30 | 45 | .800 | 1.800 | 46.8 |
| five | direct drive | | 1.000 | 2.25 | 58.5 |
| six | 30 | 45 | 1.25 | 2.812 | 73.1 |
| seven | 48 | 36 | 1.4 | 3.15 | 81.9 |
| eight | 66 | 27 | 1.55 | 3.488 | 90.7 |
| nine | 84 | 18 | 1.7 | 3.825 | 99.5 |

Referring now to FIG. 10, it can be seen that the spindle 14 is clamped in the dropout at the lower end of the seat stay 66 by an over center quick disconnect comprising a cap link 67, a pair of spring links 68 located on either side of the cap link, and a handle 69. The cap link is joined to the frame at the forward side of the dropout by the steel pin 77. The spring links 68 are joined to the cap link with the steel pin 78, and to the handle 69 with the steel pin 79. Placing the nose of the handle in a notch at the aft side of the dropout and rotating the handle up and forward forces the spring links overcenter and preloads the cap against the spindle. An identical quick disconnect is used with the left side dropout.

While this invention has been described in terms of a few preferred embodiments, it is anticipated that persons skilled in the art upon reading the preceding descriptions and studying the drawings will realize many possible modifications thereof. For example, the planet gears could be mounted in the planet gear carrier on roller bearings or ball bearings instead of on oil filled sintered bronze bushings shown; or the nine speed transmission could be made eleven speed through the addition of one more sun gear and its mating planets. It is therefore intended that the following appended claims be interpreted as including all such modifications as fall within the true scope and spirit of the present invention.

I claim:

1. In a bicycle with a frame with a bottom bracket, a chain stay on one side, a pair of conventional seat stays with dropouts on the lower ends of said seat stays, a rear spindle located in said dropouts and fixed by said frame, an enclosed chain drive comprising:

a steel tube with a flange on one end rotatably mounted and axially captive within said bottom bracket;

a chain case press fit on said steel tube inside said flange;

a pedal drive shaft mounted on conventional ball bearings within said steel tube with said steel tube forming the outer race for said ball bearings on the chain case side, and a conventional bearing nut threaded in the opposite end of said steel tube forming the outer race for the ball bearings on the other side;

a locknut securing the position of said bearing nut;

a forward sprocket located within said chain case and fixed on said pedal drive shaft for rotation therewith;

a rear sprocket fixed on a drive fitting rotatably mounted on said rear spindle and located within said chain case;

a conventional drive chain located within said chain case and trained about said rear sprocket and said forward sprocket for driving said rear sprocket from said forward sprocket;

a chain case cover enclosing said sprockets and said drive chain; said chain case cover being attached to said chain case with screws and providing axial support and indexing for said rear spindle;

left and right side pedal crank arms fixed on said pedal drive shaft with a shoulder on one of said pedal crank arms a close running fit inside said chain case cover and a shoulder on the other a close running fit inside said locknut;

and an over center quick disconnect located on each of said dropouts and clamping each end of said rear spindle in said dropouts.

2. In a bicycle with a frame, a rear spindle clamped to said frame, a rear wheel with a hub mounted for concentric rotation about said rear spindle, a drive fitting rotatably mounted on said rear spindle, a rear sprocket fixed on said drive fitting, and an enclosed drive chain and forward sprocket driving said rear sprocket, according to claim 1, an improved multiple speed planetary transmission comprising:

- a gear case rotatably mounted on said rear spindle within said hub and bolted to a flange of said hub;
- a gear case closing plate rotatably mounted on said drive fitting;
- a single ring gear rotatably mounted within said gear case;
- a single planet gear carrier rotatably mounted within said ring gear;
- multiple sets of planet gears with multiple planet gears in each set rotatably mounted on said planet gear carrier and in constant mesh with said ring gear;
- multiple sun gears rotatably mounted on said rear spindle with each of said sun gears in constant mesh with one of said multiple sets of planet gears;
- sun gear locking means operative for locking any selected one of said multiple sun gears to said rear spindle;
- a drive ring with external teeth and an internal spline; said external teeth engaging either said ring gear or said planet gear carrier; said internal spline engaging said drive fitting; said drive ring being axially movable for selectively driving either said planet gear carrier or said ring gear from said drive fitting;
- a first one way clutch means for driving said gear case from said planet gear carrier; and
- a second one way clutch with pawls on said ring gear engaging ratchet teeth on said gear case closing plate for driving said gear case, with means for disengaging said pawls from said ratchet teeth through engagement of said ring gear with said drive ring.

3. An improved multiple speed planetary transmission according to claim 2 wherein said sun gear locking means includes multiple external circumferential grooves and a pair of diametrically opposed internal axial grooves in said rear spindle; a pair of ring halves with multiple internal teeth and multiple external teeth being installed in each of said multiple circumferential grooves; with each pair of said ring halves centered inside one of said multiple sun gears; said external teeth on said ring halves locking said ring halves to said sun gears for rotation therewith; a sun gear selector with radial arms keyed to said axial grooves in said spindle; a tooth form on the ends of said radial arms matching the tooth form of said multiple internal teeth on said ring halves for engaging said internal teeth and locking the associated one of said multiple sun gears to said spindle; and wherein said sun gear selector is axially movable for engaging any one of said multiple pairs of ring halves.

4. An enclosed chain drive according to claim 1 wherein said over center quick disconnect clamping said spindle in said dropouts includes a cap rotatably pinned to said frame forward of the associated one of said dropouts; a pair of spring links rotatably pinned to said cap; a handle rotatably pinned to said spring links; and a notch in said frame aft of said dropout for receiving said handle.

* * * * *